(No Model.)

J. C. MESSER, A. GARNER & J. W. WILLIAMS.
CULTIVATOR.

No. 437,309. Patented Sept. 30, 1890.

Witnesses
J. M. Fowler Jr.
Wm. Bagger

Inventors
Jeremiah Clark Messer
Allen Garner
John W Williams
By their Attorneys
C. A. Snow & Co.

UNITED STATES PATENT OFFICE.

JEREMIAH CLARK MESSER, ALLEN GARNER, AND JOHN WINN WILLIAMS, OF STAPLE'S STORE, TEXAS.

CULTIVATOR.

SPECIFICATION forming part of Letters Patent No. 437,309, dated September 30, 1890.

Application filed June 12, 1890. Serial No. 355,244. (No model.)

*To all whom it may concern:*

Be it known that we, JEREMIAH CLARK MESSER, ALLEN GARNER, and JOHN WINN WILLIAMS, citizens of the United States, residing at Staple's Store, in the county of Guadalupe and State of Texas, have invented a new and useful Cultivator and Double Shovel, of which the following is a specification.

This invention relates to cultivators; and it has for its object to construct a device of this class which shall be simple, durable, and inexpensive, and in which the blades or shovels shall be attached to the standards in such a manner that in the event of obstacles such as rocks or stumps being encountered during the operation of our machine the blades shall become detached, thereby avoiding injury to the machine.

The invention consists in the improved construction, arrangement, and combination of parts, which will be hereinafter fully described, and particularly pointed out in the claims.

Figure 1:
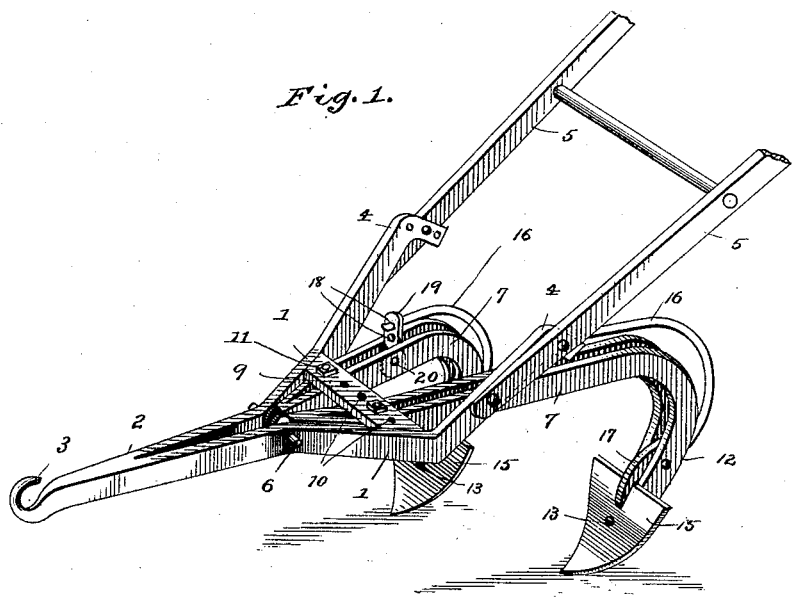
Figure 2:
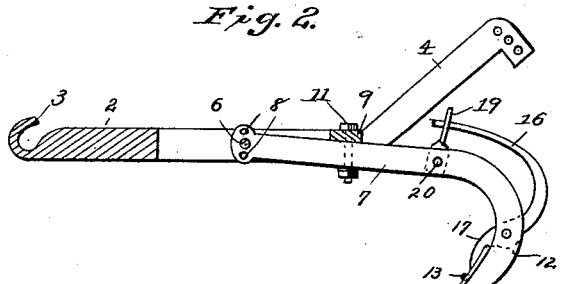
Figure 4:
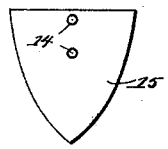
Figure 3:
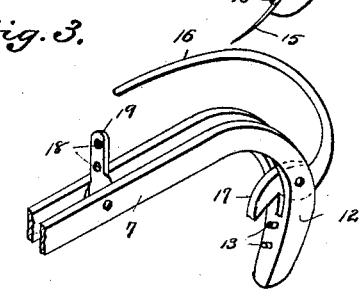

In the drawings, Figure 1 is a perspective view of a double plow or cultivator embodying our improvements. Fig. 2 is a longitudinal sectional view of the same. Fig. 3 is a detail of one of the standards with the blade or shovel detached. Fig. 4 is a detail view of one of the blades or shovels.

Like numerals of reference indicate like parts in all the figures.

The frame of our improved cultivating implement is composed of the side pieces 1 1, which converge at the front to form the beam 2, which is provided with a hook 3 for the attachment of the draft. The rear ends of the side pieces 1 1 are extended upwardly and form the arms 4 4, to which the handles 5 5 are secured.

6 designates a bolt, which passes transversely through the side pieces 1 1, and upon this bolt we mount the cultivator-beams 7, of which one or more may be used. In the drawings hereto annexed we have shown two of the cultivator-beams in position for operation, this being the number usually preferred. The front ends of the said cultivator-beams are provided with series of perforations 8, in order that vertical adjustment of the point of attachment may be had. The side pieces 1 1 of the frame are connected by a cross-bar 9, having a series of perforations 10. To this cross-bar the cultivator-beams may be secured by means of bolts 11, the series of perforations 10 admitting of adjustment of the said beams laterally in the frame.

The cultivator-beams which we prefer to use are made of iron, and are curved downwardly and forwardly at their rear ends to form the standards 12, which are bifurcated, as shown. The standards are provided on their front sides, near their lower ends, with outwardly-extending lugs or studs 13 to engage the perforations 14, which are formed for their reception in the blades or shovels 15. In the top portions of the standards are pivoted the levers 16, which have forwardly and downwardly extending arms 17, adapted to bear against the shovels or blades when the latter have been placed in position upon the standards. The upper arms of the levers are extended upwardly and forwardly above the cultivator-beams, and are adapted to engage perforations 18 in the latch-plates 19, which are pivoted upon bolts 20, extending transversely through the cultivator-beams. The said levers will thus serve to hold the cultivator blades or shovels securely in position upon the standards.

When in operation obstructions are encountered by the cultivator blades or shovels, the upper edges of the latter will press forwardly against the arms 17 of the levers 16. The upper ends of the latter will thus be thrown out of engagement with the perforated latch-plates, and the shovel will thus become detached from the standard without injury to any part of the machine. It is obvious that the shovel may be very easily and quickly replaced in position for operation.

By the use of this device the ordinary break-pins are dispensed with—an advantage that will be readily appreciated, inasmuch as said break-pins are not always conveniently at hand.

The general construction of our improved cultivating implement is simple and inexpensive, and the beams may be readily adjusted in the frame to any desired position.

Having thus described our invention, we claim—

1. In a cultivator, the combination of the frame composed of the converging side pieces provided at their rear ends with upwardly-extending arms, to which the handles are adjustably attached, the cross-bar connecting the side pieces and having a series of perforations, the cultivator-beams mounted pivotally and adjustably upon a bolt connecting the sides of the frame, and the bolts connecting the beams adjustably with the cross-bar of the frame, substantially as set forth.

2. In a cultivator, the combination, with the cultivator-beam and standard, which latter is provided with forwardly-extending lugs or studs, of a lever connected pivotally with the standard and having a downwardly-extending arm adapted to bear against said standard and an upwardly and forwardly extending arm, and a pivoted latch-plate having a series of perforations adapted to engage the said lever, substantially as set forth.

3. The combination of the cultivator-beam and standard, which latter is provided with forwardly-extending lugs or projections, the lever mounted pivotally on the same and having an upwardly and forwardly extending arm, a pivoted latch-plate having a series of perforations, and a blade or shovel having perforations to engage the lugs projecting from the standard, substantially as and for the purpose set forth.

4. In a cultivator, the combination of the beam having the slotted standard provided with forwardly-extending lugs or projections, the lever mounted pivotally in said slotted standard and having an upwardly and forwardly extending arm, a pivoted latch-plate having a series of perforations, and a plate or shovel having perforations to engage the lugs extending from the standard and adapted to be held in position by the arm extending downwardly from the lever pivoted in said standard, substantially as and for the purpose set forth.

In testimony that we claim the foregoing as our own we have hereto affixed our signatures in presence of two witnesses.

JEREMIAH CLARK MESSER.
ALLEN GARNER.
JOHN WINN WILLIAMS.

Witnesses:
  E. P. WALLER,
  A. H. TUTTLE.